United States Patent [19]

Grene

[11] Patent Number: 5,156,436
[45] Date of Patent: Oct. 20, 1992

[54] VEHICLE SAFETY RESTRAINT

[76] Inventor: Ethel Grene, 3243 Lake Ave., Wilmette, Ill. 60091

[21] Appl. No.: 656,288

[22] Filed: Feb. 15, 1991

[51] Int. Cl.⁵ .............................................. B60N 2/42
[52] U.S. Cl. .................................... 297/250; 297/466; 297/484
[58] Field of Search ......... 297/250, 464, 466, 484–486

[56] References Cited

U.S. PATENT DOCUMENTS

| | | | |
|---|---|---|---|
| 1,298,615 | 3/1919 | Wilkinson | 297/485 X |
| 2,619,157 | 11/1952 | Guyton et al. | 297/353 X |
| 3,604,750 | 9/1971 | Doering | 297/485 X |
| 3,779,599 | 12/1973 | Gottfried | 297/484 X |
| 3,901,550 | 8/1975 | Haney | 297/486 |
| 4,190,287 | 2/1980 | Lemisch et al. | 297/466 |
| 4,402,548 | 9/1983 | Mason . | |
| 4,431,234 | 2/1984 | Lacey . | |
| 4,488,691 | 12/1984 | Lorch . | |
| 4,610,463 | 9/1986 | Efrom . | |
| 4,762,364 | 8/1988 | Young . | |
| 4,770,468 | 9/1988 | Shubin | 297/250 X |
| 4,790,601 | 12/1988 | Burleigh et al. . | |
| 4,874,203 | 10/1989 | Henley | 297/250 |

FOREIGN PATENT DOCUMENTS 1238617  4/1967  Fed. Rep. of Germany ...... 297/466

Primary Examiner—Peter R. Brown
Attorney, Agent, or Firm—Leydig, Voit & Mayer

[57] ABSTRACT

A vehicle safety restraint for pregnant women is provided which includes first and second restraint members which are interconnected to one another by a common element. The common element is removably mounted on a seat of the vehicle. The first restraint members, when in an operative mode, encompass the upper torso region of the woman. The second restraint members, when in an operative mode, encompass in the groin area thigh regions of the woman. When in the operative mode, the first and second restraint members are spaced from the gravid uterus region of the woman thereby avoiding trauma in the latter region if the vehicle should suddenly stop.

10 Claims, 5 Drawing Sheets

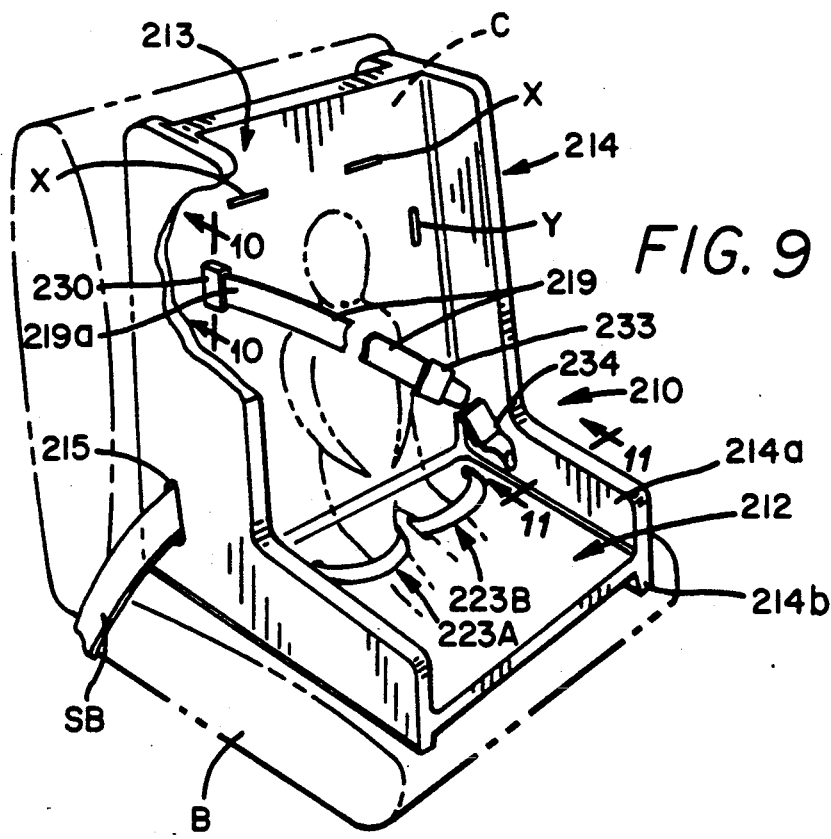
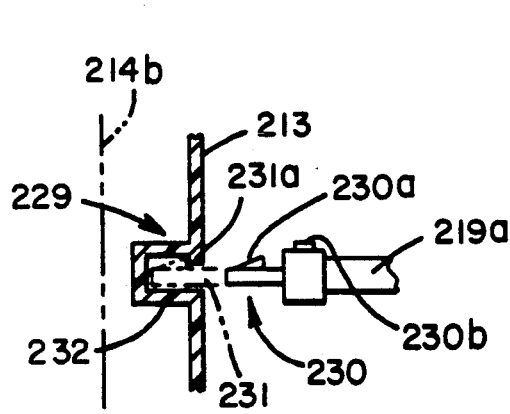
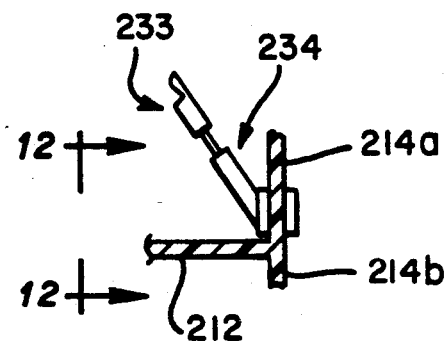
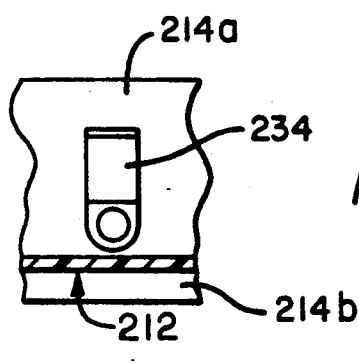

VEHICLE SAFETY RESTRAINT

BACKGROUND OF THE INVENTION

The utilization of seat and shoulder belts when riding in a motor vehicle has become mandatory or highly recommended in most geographical areas throughout the United States. Safety studies have established that in most types of accidents involving motor vehicles the occupants utilizing seat and shoulder belts at the time avoided serious injuries to a much greater extent than those not utilizing such belts. Where, however, the occupant of the vehicle is a pregnant woman, the utilization of the conventional seat and shoulder belts provided in the vehicle can cause serious trauma to the pregnant (gravid) uterus in the event the vehicle is involved in an accident or a sudden stop. Such trauma is due to the arrangement, location and/or interconnection of such belts whereby they dangerously impinge upon the vulnerable gravid uterus and frequently cause injury to the fetus and placenta located in such region.

In an attempt to rectify this situation a protective shield such as disclosed in U.S. Pat. No. 4,610,463 has been proposed. Such a device, however, enhances rather than diminishes the dangerous impingement of the gravid uterus because the force is concentrated by the shield at such body region. Furthermore, such a shield is uncomfortable to the occupant because of size and texture and may interfere with manual maneuvers required for safe operation of the vehicle where the user is the driver.

Various vehicle safety restraints are presently available for infants. However, while such restraints are generally suitable for infants up to the age of about four years they are not, however, suitable for children from ages about four-ten years because such a child could not fit into and be safely accommodated in the bucket type seat which normally comprises a major component of such a restraint. The shoulder and lap (seat) belts standard in most current model vehicles are sized and shaped to accommodate adults of normal physical dimensions and are not for children of the age of about four to ten. As a result, children in this age bracket are prone in many instances not to use the restraints at all or use only the lap belt with the shoulder belt being tucked between the back of the child and the vehicle seat back. Using only the lap belt for the child has been found in many instances to be a dangerous practice because of the location of such lap belt with respect to the pelvis region of the child. Upon a sudden stop of the vehicle severe impinging force may be exerted by the lap belt on the pelvis and lower abdominal regions of the child causing serious and sometimes fatal internal injuries to occur.

SUMMARY OF THE INVENTION

Thus, a vehicle safety restraint for use by both pregnant women and children within an age range from about 4 years to about 10 years has been provided which avoids all of the aforenoted shortcomings associated with prior vehicle restraints.

The improved vehicle safety restraint is compact, comfortable to the user and may be readily transferred between various vehicles.

The improved vehicle safety restraint utilize the existing, conventional safety belts or straps provided on the vehicle to secure such restraint in a proper location on the vehicle seat.

The improved restraint is capable of comfortably accommodating either pregnant women or children of varying physical dimensions.

Further and additional advantages of the improved restraint will become apparent from the description, accompanying drawings and appended claims.

In accordance with one embodiment of the invention, a vehicle safety restraint is provided which includes a body-supporting unit which is adapted to be removably secured in place on a vehicle seat. The unit is adapted to accommodate a pregnant woman while in a seated position and includes a lower section which subtends and supportingly engages the pelvis and thigh regions of the seated woman. Extending angularly upwardly from the unit lower section is an upper section which is interposed between the vehicle seat back and the dorsal torso region of the woman. Attached to the unit sections is a harness means which engages and retains the woman within the unit. The harness means includes a plurality of flexible first restraint members mounted on peripheral portions of the unit upper section for releasably encompassing the woman's upper torso region. The harness means also includes a plurality of flexible second restraint members which are spaced from and independent of the first restraint members. The second restraint members are attached to the unit lower section and are adapted to releasably encompass thigh regions of the seated woman. When the restraint members are in an operative mode, they are spaced from the woman's gravid uterus region thus, avoiding impingement thereof.

DESCRIPTION

For a more complete understanding of the invention reference is made to the drawings wherein:

FIG. 9 is a fragmentary perspective front view of a third embodiment of the improved vehicle safety restraint shown unoccupied and adapted to accommodate a young child, the latter being shown in phantom lines.

FIGS. 10 and 11 are enlarged fragmentary sectional views taken along lines 10—10 and 11—11, respectively, of FIG. 9.

FIG. 12 is a fragmentary elevational view taken along line 12—12 of FIG. 11.

Figure 5:
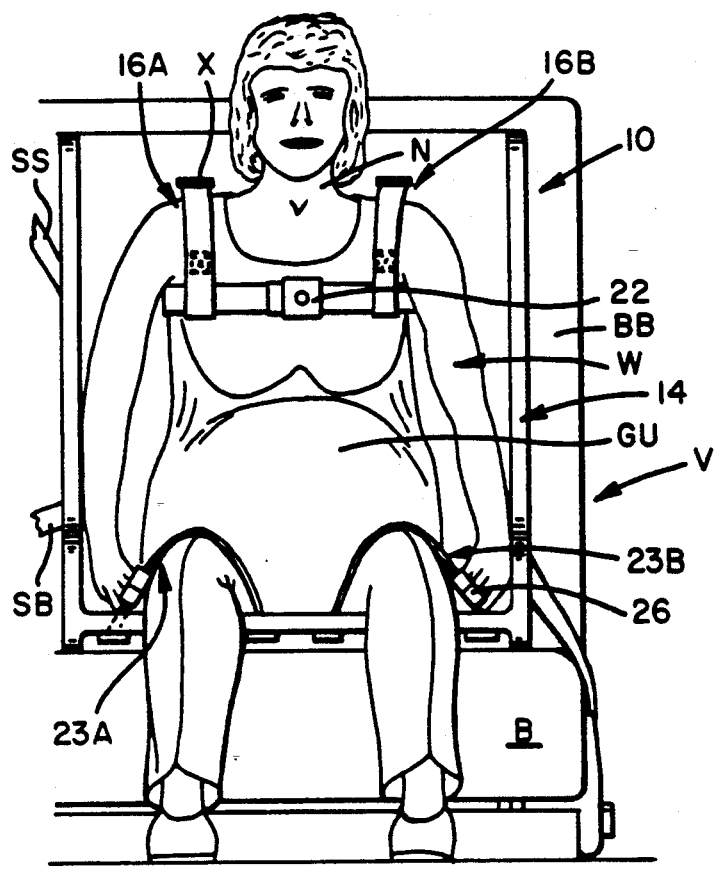
FIGS. 5 and 6 are front and side views, respectively, of the restraint of FIG. 1 shown occupied by a pregnant woman.
Figure 6:
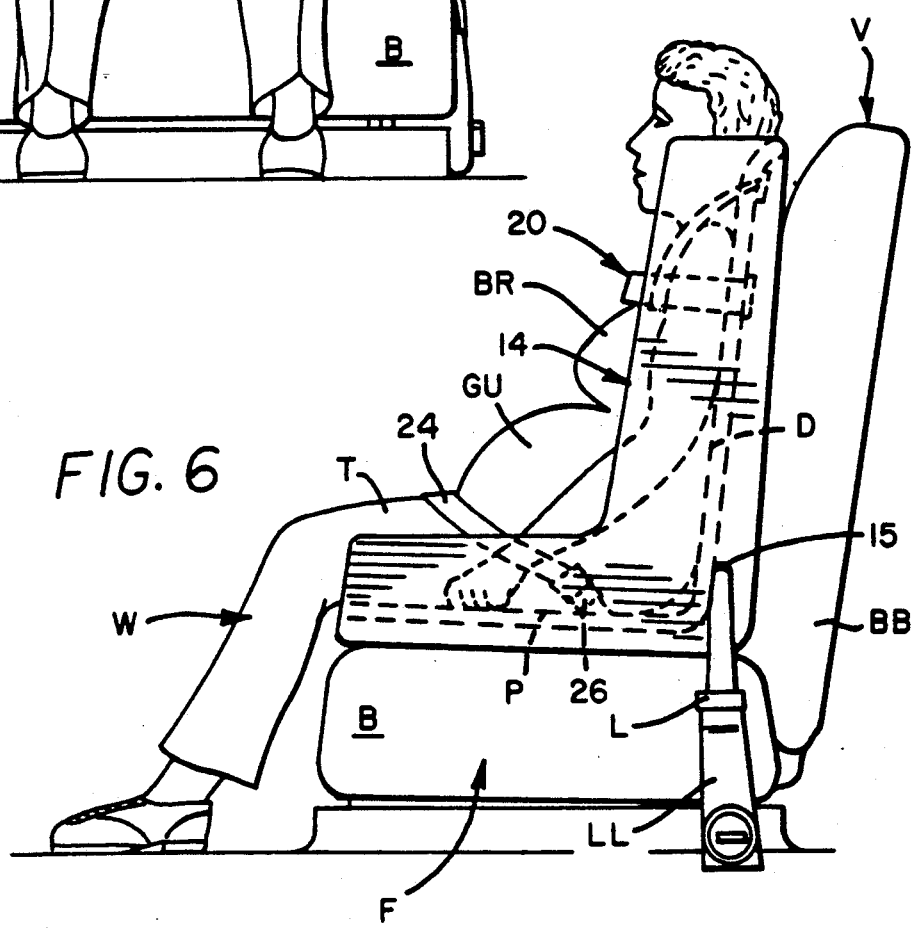

Referring now to the drawings and more particularly to FIGS. 5 and 6, one embodiment of a vehicle safety restraint 10 is shown being used by a pregnant woman W while riding in a motor vehicle V. At the present time, seat belts SB, sometimes referred to as lap belts, and shoulder belts SS are standard equipment on most present day passenger motor vehicles, particularly for occupants of the front seat F. The seat and shoulder belts may vary in size and shape and in the way they are mounted within the vehicle; however, there is normally provided sets of belts for the driver and at least one front seat passenger. Each set includes an extendable lap belt and shoulder belt. The lap belt normally has one end thereof disposed within a cartridge or case, not shown, which is anchored at a convenient location on the vehicle body frame adjacent one side of the vehicle seat F. The opposite end of the belt is exposed and provided with a lock component L, see FIG. 6, which is adapted to manually engage a complemental lock component LL which is anchored at a second location laterally spaced a substantial distance from the cartridge. The cartridge is provided with a suitable braking means which automatically stops the extension, or payout, of the belt from the cartridge when the belt is subjected to a sudden jerk or pull.

A similar arrangement may be provided for the shoulder belt except that the cartridge therefor may be anchored at a different location, such as on a door post. The opposite end of the shoulder belt may either be secured to the exposed seat belt behind the lock component L, or it may also have a separate lock component which manually engages a complemental lock component, not shown, located proximate lock component LL. The construction and mounting of the seat and shoulder belts are well known and form no part of the claimed invention.

A conventional safety shoulder belt, when in a normal operative mode, extends diagonally across the front of an adult person occupying the vehicle seat so as to overlie a portion of the body upper torso region, a portion of the abdominal region, and a portion of the lower torso region. Under normal conditions, such an arrangement of the shoulder strap and lap belt with respect to the seated adult is comfortable as well as an effective restraint in case of an accident or sudden stop. Where however, the occupant is a pregnant woman, the arrangement of the conventional shoulder and lap belts when in the operative mode, can produce severe trauma to the woman as well as the developing placenta and fetus within the woman. Such trauma can be particularly severe when the woman is in the stage of her pregnancy wherein she has a gravid uterus region. Heretofore, when the woman is at such a stage of her pregnancy, she may for reasons of comfort and perceived risk, omit the use of the belts altogether, thus, exposing herself to the hazard of her body and head striking the dashboard, steering wheel and/or windshield or being thrown from vehicle in case of collision.

Figure 3:
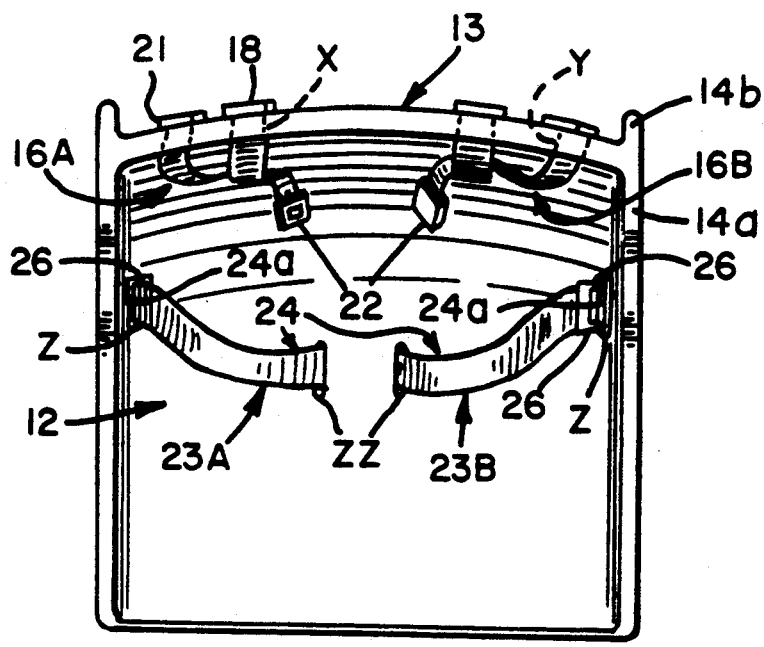
FIG. 3 is a top view of the restraint of FIG. 1.
Figure 4:
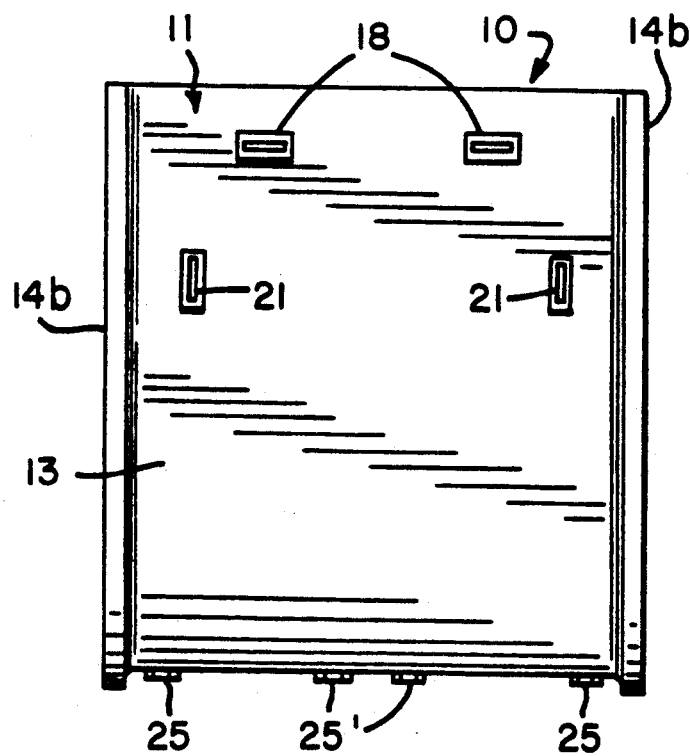
FIG. 4 is a fragmentary rear elevational view of the restraint of FIG. 1.

The restraint 10 hereinafter described avoids such problems relating to pregnant women in a simple yet effective way. Restraint 10 includes a chairlike body-supporting unit 11 which is preferably of one piece construction and is formed of lightweight metal or lightweight high impact plastic. The unit may be produced in a conventional way (i.e. molding, thermoforming, etc.) and includes a lower section 12, which rests upon the substantially horizontal bottom section B of the vehicle seat F so as to subtend and supportingly engage the pelvis and thigh regions P and T respectively, of the body. Extending angularly upwardly from the rear of the lower section 12 is an upper section 13. When the restraint is being used, the upper section 13 is interposed between the dorsal torso region D of the woman W and the back support section BB of the vehicle seat F. To add strength and rigidity to the unit 11 flange-like side sections 14 may be provided which interconnect corresponding side edge portions of the lower and upper sections. The side sections 14 preferably project forwardly and rearwardly from the unit upper section 13 and project upwardly and downwardly from the unit lower section 12, see FIGS. 3 and 4. The surfaces of the upper, lower and side sections of the unit which are adjacent the woman occupying the unit may be contoured to conform more closely to the body regions engaging same and may be covered with suitable padding, not shown, for added comfort.

The forwardly and upwardly projecting portions 14a of the side sections 14 assist in restraining lateral shifting of the woman relative to the unit.

Figure 2:
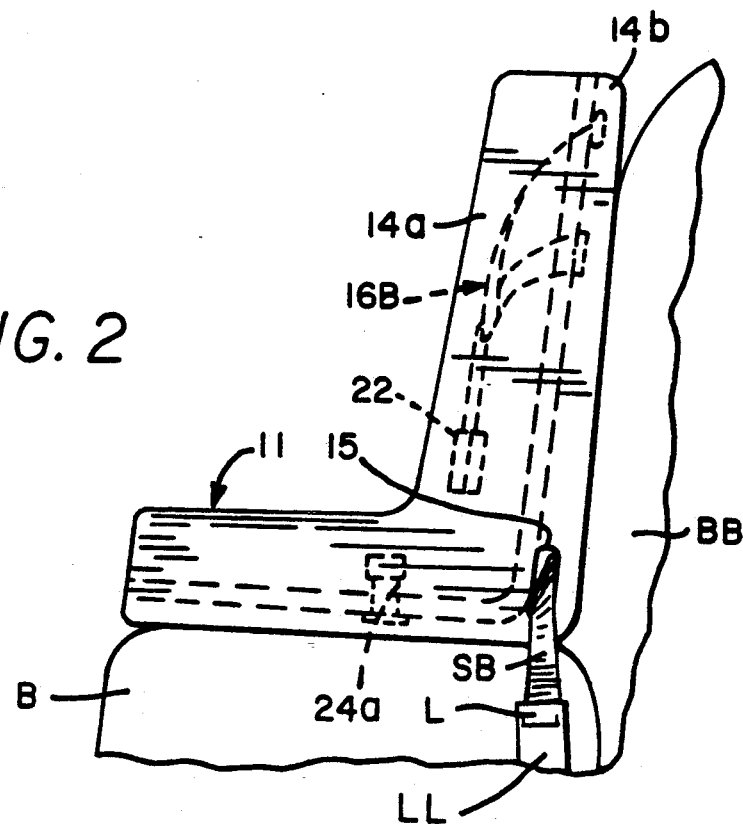
FIG. 2 is a right side elevational view of the restraint of FIG. 1.

As seen in FIG. 2, the rearwardly extending portions 14b of the side sections 14 near the lower section 12 may be provided with laterally aligned openings 15 which are sized to conveniently accommodate a portion of the vehicle's standard seat belt SB or portions of both the seat and shoulder belts, see FIG. 6, when the unit is to be secured in place on the vehicle seat. The amount of rearward extension of the side section portions 14b and the thickness thereof should be such as to readily withstand any forces exerted thereon by the belt, or belts, accommodated in the openings 15 when the vehicle is caused to suddenly stop.

As seen in FIGS. 1-4, the unit upper section 13 is provided with a pair of first restraint members arranged in complemental sets 16A and 16B. Each set is of like construction and includes a flexible shoulder-engaging strap 17 having one end 17a thereof extending through a suitable opening X, see FIG. 1, formed in the upper end portion 13a of unit section 13. The strap end 17a terminates behind unit section 13 and is affixed to a suitable bracket 18 mounted on the backside of unit section 13, see FIG. 4. The other end 17b of the strap 17 is preferably connected to a transversely extending flexible chest strap 20. One 20a of strap 20 extends through a suitable opening Y formed in the upper end portion 13a of section 13, see FIGS. 1 and 3 and is affixed to a suitable bracket 21 mounted on the backside of section 13, see FIG. 4. The opposite, or exposed, end 20b of strap 20 is provided with a buckle component 22. The straps 17 and 20 are preferably formed of suitable synthetic material commonly used for the standard vehicle seat belts SB and shoulder belts SS.

When the sets of first restraint members 16A and 16B are in the operative mode, the buckle components 22 interlock with one another thereby forming a harness for the woman's upper torso region, see FIGS. 5 and 6. It will be noted that the straps 17 are laterally spaced from one another and are disposed on opposite sides of the neck region N. The chest straps 20, on the other hand, are disposed above the breast region BR of the woman. Both straps 17 and 20 may be provided with conventional devices, not shown, for adjusting the lengths thereof so as to properly accommodate the various regions of the body. Because of the flexibility of the strap material, the straps will readily conform substantially to the contour of the body region engaged thereby. As seen in FIG. 5, the chest straps 20 extend under the arms of the woman thereby permitting unrestricted arm movement.

The thigh regions T of the woman are encompassed by a pair of second restraint members 23A, 23B. Each member 23A, 23B is of like construction and may be formed of the same synthetic material used for the aforedescribed first restraint members. Each member 23A, 23B may include a pair of complementary strap segments 24. One end 24a of segment 24 extends through a suitable opening Z formed in the unit lower section 12 and is affixed to a bracket 25 mounted on the underside of the unit lower section 12. One end of the other segment 24 of each pair extends through another opening ZZ which is spaced laterally inwardly from the corresponding opening Z. A suitable bracket 25' is secured to the concealed surface of the lower section and is aligned with opening ZZ. The bracket 25' provides an anchor for the one end of one segment of the pair.

It should be noted in the illustrated embodiment that all of the brackets 18, 21, 25 and 25' are disposed between the side sections 14 and project from the respective unit sections 12 and 13 a shorter distance than the side section portions 14b. Thus, the brackets and strap ends affixed thereto do not interfere with the stability of the unit when positioned on the vehicle seat F.

The opposing ends 24b of the strap segments 24 may be provided with suitable buckle components 26. As in the case of the harness straps 17 and 20, the strap segments 24 may include suitable means, not shown but commonly utilized in safety straps and belts, for adjusting the lengths thereof to comfortably accommodate the body region encompassed thereby. Thus, when the restraint members 23A and 23B are in the operative mode, the woman's thigh regions T are securely retained in place on the unit lower section 12. It should be noted in FIG. 6 that the restraint members 23A and 23B engage the thigh regions in the groin area and below the woman's gravid uterus region GU. Thus, neither the first and second restraint members 16A and 16B and 23A and 23B, when in the operative mode, impinge upon the critical gravid uterus region GU and thus, no trauma to the vulnerable gravid region due to the restraint members is experienced by the woman.

Figure 7:
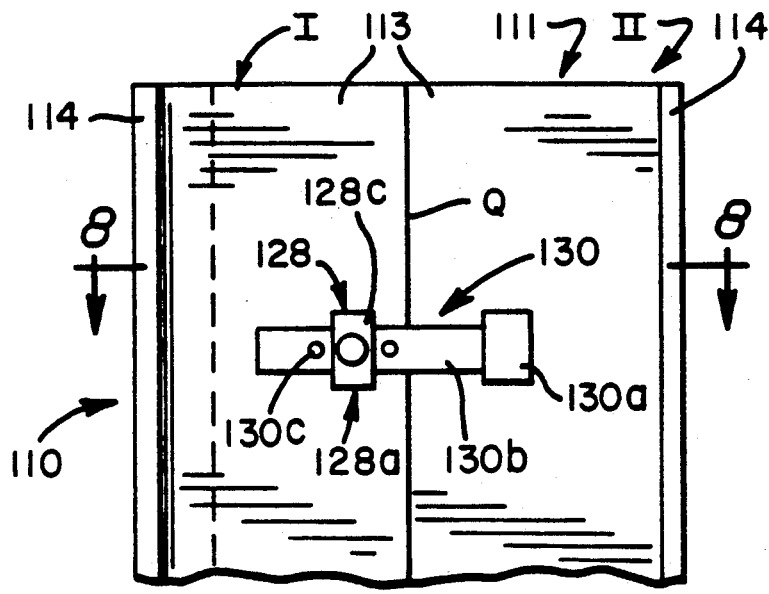
FIG. 7 is a fragmentary rear elevational view of a second embodiment of vehicle safety restraint with a laterally adjustable body supporting unit.
Figure 8:
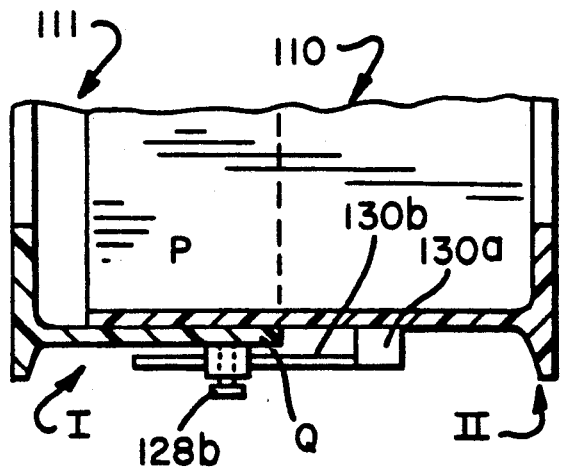
FIG. 8 is a fragmentary sectional view taken along line 8—8 of FIG. 7.

FIGS. 7 and 8 disclose a modified restraint 110 having a body-supporting unit 111 which includes a feature whereby the lateral, or width, dimension of the unit can be varied to comfortably accommodate women of varying physical or anatomical characteristics. Unit 111 is formed of two components I and II which are similar in configuration. Each component includes a partial lower section, not shown, a partial upper section 113 extending angular upwardly therefrom, and one side section 114. The width dimension of component II, in the illustrated embodiment, is greater than the corresponding dimension of component I so that when the components are assembled to form the unit 111, the inner edge portion P of component II will overlie the inner edge portion Q of component I, see FIG. 8. The backside of each component is provided with adjustable connectors 128, 130 which cooperate with one another to allow the amount of overlap of the inner edge portions P, Q to be selectively maintained. Connector 128 may be an inverted C-shaped bracket 128a which is fixedly secured to the backside of component I and cooperates therewith to form a laterally extending opening. Connector 130, on the other hand, may include a post-like bracket 130a which is affixed component II. Extending laterally from and affixed to the distal, or outer, end of bracket 130a is an elongate tongue or finger 130b which may be provided with a plurality of longitudinally spaced holes 130c. The components I, II are manually adjusted so that a selected hole is aligned with an adjustable pin 128b mounted on the center segment 128c of the C-shaped bracket 128. The pin 128b may be spring-biased towards the backside of component I. To release the pin from locking engagement a selected hole 130c merely requires an outward pulling force to be applied to an enlarged exposed end of the pin. If desired and in lieu of the pin being spring-biased, it may be threaded into an internally threaded opening formed in the bracket center segment 128c.

While only one pair of connectors is shown in FIGS. 7 and 8, additional pairs of connectors, not shown, are mounted on the concealed surfaces of the lower and upper sections of components I and II. Other forms of connectors than shown may be utilized to secure the unit components I and II in assembled relation. In addition the configuration of the unit upper and lower sections may be varied from that shown without departing from the scope of the invention. For example, the forward and upward projecting portions 14a, 114a of the side sections 14 and 114 may be reduced or eliminated, if desired, to facilitate the woman getting into or out of the unit.

Figure 1:
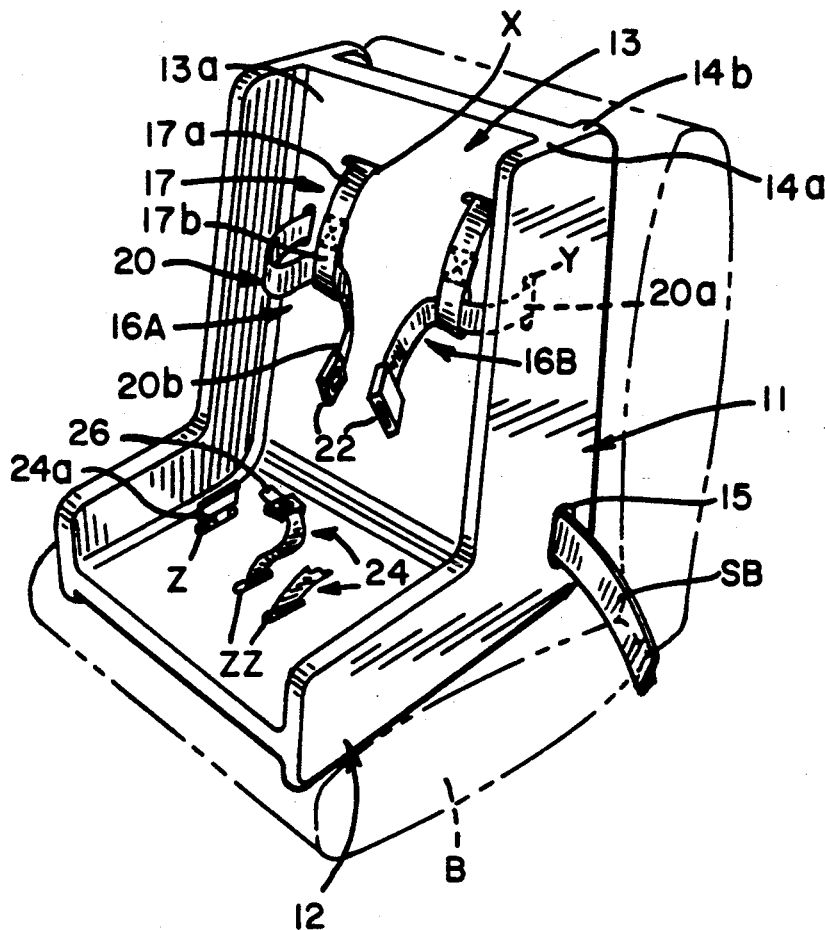
FIG. 1 is a fragmentary perspective view of one embodiment of the vehicle safety restraint for pregnant woman shown unoccupied and secured in place on a vehicle seat.

FIGS. 9–12 disclose a further modified embodiment of the improved vehicle safety restraint 210 which is capable of accommodating either a pregnant woman or a child C of about four to about ten years old. The child is shown in phantom lines in FIG. 9. The principal differences between restraints 10 and 210 are that in the latter the upper, or first, set of restraint members 16A and 16B, as shown in FIG. 1, are capable of being detached from the upper section 213 of unit 211 when desired. Thus, when restraint 210 is to be used to accommodate the child C, the sets of restraint members 16A and 16B are detached from the unit 211. In place thereof, a supplementary shoulder strap section 219 is utilized. The upper end 219a of strap section 219 is provided with a conventional lock component 230, see FIG. 10, which is adapted to engage a first supplementary lock component 229 which includes a suitable opening 231 formed in the upper section 213 of unit 211 adjacent one side edge of unit 211. Opening 231 is spaced from opening Y through which one end 20a of one chest strap 20 would normally extend. Aligned with opening 231 and extending rearwardly from the unit upper section is a pocket 232 which forms a part of the first supplementary lock component 229. One side of opening 231 has a depending tongue 231a which coacts with a spring-loaded lug 230a carried by lock component 230 to effect interlocking of the components. A finger-actuated button 230b may be provided on component 230 to effect unlocking of components 230 and 229, when desired. Various other types of lock components than those shown may be utilized.

In lieu of providing a separate opening 231 for the first supplementary lock component 229, the openings X and Y already formed in the unit upper section 213 to normally accommodate the respective ends of the shoulder and chest straps 17, 20, may be configured to accommodate the lock component 230 carried on the end 219a of the supplemental strap section 219. In this latter arrangement either opening X or Y disposed to one side of the unit upper section may be utilized depending upon the size of the child being accommodated in the unit 211.

The opposite, or lower, end of strap section 219 may be provided with a similar lock component 233, see FIG. 11, which is adapted to engage a second supplementary lock component 234. Component 234 may be pivotally attached to the upwardly projecting portion 214a of the side section 214 of the unit 211. The second supplementary lock component 234 is located proximate a side edge portion of unit 211. Strap section 219 may be provided with conventional means, not shown, for varying the length thereof so as to properly engage the front torso region of the accommodated child. Other than the additional supplementary lock components 229 and 234, the units 11 and 211 are basically the same. The sets of lower restraint members 23A and 23B provided on unit 11 may be provided in a like manner as sets of lower restraint members 223A and 223B on unit 211. Restraint members 223A and 223B encompass the thigh regions of the accommodated child in the vicinity of the groin. When the members 223A and 223B are properly encompassing the child's thigh regions, they are safely disposed below the pelvis region and will not cause serious internal injury to the pelvis or abdominal regions of the child if the vehicle should come to a sudden stop.

Unit 211 may incorporate the laterally adjustable feature of the afore-described unit 111. All of the restraints 10, 110 and 210 may be readily utilized in either the front or rear seat of a vehicle. Furthermore, in all instances, the unit is retained on the vehicle seat by utilizing the safety belts provided as standard equipment on the vehicle and may be readily transferred between various vehicles. While the various improved vehicle restraints are of simple construction, they nevertheless provide effective protection for the user, and do not unduly restrict the person's arm movement.

I claim:

1. A vehicle safety restraint to avoid trauma to the gravid uterus region of a pregnant woman while seated in a motor vehicle, the latter being provided with vehicle safety belts, said restraint comprising flexible first restraint members for releasably encompassing in a substantially horizontal direction an upper torso region of the woman above the gravid uterus region; flexible second restraint members spaced from and operative independently of said first restraint members for releasably and individually encompassing in a groin area each thigh region of the woman below the gravid uterus region; and a pre-shaped body-supporting means connected to said first and second restraint members, said body-supporting means being adapted to be releasably engaged by the vehicle safety belts for removable attachment to a vehicle seat on which the woman is seated, said first and second restraint members when in an encompassing mode being relatively disposed so as not to impinge upon the gravid uterus region of the seated woman.

2. The vehicle safety restraint of claim 1 wherein the body-supporting means includes a substantially rigid, chair-like, unit having a lower section for subtending and supportingly engaging pelvis and thigh regions of the seated woman, and an upper section extending angularly upwardly from the lower section for interposing between a dorsal torso region of the seated woman and a back support section of the vehicle seat.

3. The vehicle safety restraint of claim 2 wherein the body-supporting unit is of one piece construction.

4. The vehicle safety restraint of claim 2 wherein the upper and lower sections of the body-supporting unit each have a surface thereof contoured to accommodate the adjacent body region of the seated woman.

5. The vehicle safety restraint of claim 2 wherein the first restraint members include a pair of laterally spaced shoulder straps each having a first end connected to the unit upper section and a second end connected to an angularly disposed chest strap section, the latter having a first end connected to the upper section and spaced from ends of a corresponding shoulder strap and a distal second end provided with a complemental releasable lock component; when said first restraint members are in an operative mode, said lock components are in an interlocked relation and the chest strap sections are disposed above the gravid uterus region and in overlying relation with a frontal chest region of the seated woman, said first restraint members being adapted to retain the woman's chest region against the unit upper section when said complemental lock components are in interlocked relation; the second restraint members include independently adjustable elongate straps, each having one end portion thereof connected to the unit lower section and spaced from ends of corresponding shoulder and chest straps, said second restraint members being adapted to releasably encompass in the groin area at locations spaced from the gravid uterus region the thigh regions of the seated woman and retain same against the unit lower section.

6. The vehicle safety restraint of claim 5 wherein the first restraint members are removably connected to the unit upper section; said unit upper section being provided with a first supplementary lock component disposed adjacent one side edge portion of said unit's aid unit lower section being provided with a second supplementary lock component disposed adjacent a second side edge portion of said unit and spaced from said first supplementary lock component; and a supplementary strap segment independent of and in substitution of said first restraint members and when in an operative mode being adapted to releasably interlock with said first and second supplementary lock components, said supplementary strap segment being adjustable to releasably encompass a child when seated on the body-supporting unit in place of a pregnant woman.

7. The vehicle safety restraint of claim 2 wherein the upper and lower sections of the body supporting unit are provided with complemental interconnected laterally adjustable segments having means for retaining said segments in selective positions of lateral adjustment to accommodate the physical dimensions of various pregnant woman.

8. The vehicle safety restraint of claim 2 wherein the unit sections include means independent of said first and second restraint members and spaced frog the seated woman for releasable engagement by the vehicle safety belts and cooperating therewith to secure the unit to the vehicle seat.

9. The vehicle safety restraint of claim 7 wherein the means releasably engaged by the vehicle safety belts include laterally spaced flange-like side sections extending angularly from front and rear surfaces of the unit upper and lower sections, each side section extending from the rear surface of the unit upper section being provided with a predetermined number of openings through which a vehicle safety belt is adapted to extend.

10. The vehicle safety restraint of claim 2 wherein at least one unit section is provided with forwardly extending side sections integral with said one unit section for restricting lateral shifting of the woman accommodated within the unit.

* * * * *